United States Patent [19]
Hoglund et al.

[11] Patent Number: 6,029,216
[45] Date of Patent: Feb. 22, 2000

[54] AUTO-TERMINATION METHOD AND APPARATUS FOR USE WITH EITHER ACTIVE HIGH OR ACTIVE LOW TERMINATORS

[75] Inventors: Timothy E. Hoglund, Colorado Springs, Colo.; Erich S. Otto, Neuried, Germany

[73] Assignee: LSI Logic Corporation, Milpitas, Calif.

[21] Appl. No.: 08/884,233

[22] Filed: Jun. 27, 1997

[51] Int. Cl.[7] .................................................. G06F 13/00
[52] U.S. Cl. ........................................... 710/101; 326/30
[58] Field of Search .................................. 395/281, 306; 326/30

[56] References Cited

U.S. PATENT DOCUMENTS

| | | | |
|---|---|---|---|
| 4,220,876 | 9/1980 | Ray | 307/296 |
| 4,367,525 | 1/1983 | Brown | 364/200 |
| 4,748,426 | 5/1988 | Stewart | 333/22 |
| 4,831,283 | 5/1989 | Newton | 307/443 |
| 4,920,339 | 4/1990 | Friend et al. | 340/825.52 |
| 4,965,723 | 10/1990 | Kirk et al. | 364/200 |
| 5,029,284 | 7/1991 | Feldbaumer et al. | 307/443 |
| 5,099,137 | 3/1992 | Lattin, Jr. | 307/147 |
| 5,101,481 | 3/1992 | Anger et al. | 395/325 |
| 5,120,909 | 6/1992 | Kutz et al. | 178/63 R |
| 5,157,771 | 10/1992 | Losi et al. | 395/325 |
| 5,191,581 | 3/1993 | Woodbury et al. | 370/85.9 |
| 5,204,669 | 4/1993 | Dorfe et al. | 340/825.52 |
| 5,239,559 | 8/1993 | Brach et al. | 375/36 |
| 5,239,658 | 8/1993 | Yamamuro et al. | 395/800 |
| 5,265,038 | 11/1993 | Kowk | 364/572 |
| 5,313,105 | 5/1994 | Samela et al. | 307/99 |
| 5,313,595 | 5/1994 | Lewis et al. | 395/325 |
| 5,327,114 | 7/1994 | Straate et al. | 340/286.06 |
| 5,338,979 | 8/1994 | Mammano et al. | 307/443 |
| 5,367,647 | 11/1994 | Coulson et al. | 395/325 |
| 5,382,841 | 1/1995 | Feldbaumer | 326/30 |
| 5,410,141 | 4/1995 | Koenck et al. | 235/472 |
| 5,422,580 | 6/1995 | Mandel et al. | 326/30 |
| 5,434,516 | 7/1995 | Kosco | 326/30 |

(List continued on next page.)

FOREIGN PATENT DOCUMENTS

| | | | |
|---|---|---|---|
| 0531630 | 3/1993 | European Pat. Off. | G06F 13/40 |
| 0076921 | 4/1993 | European Pat. Off. | G06F 11/34 |
| 0645716 | 3/1995 | European Pat. Off. | G06F 13/40 |
| 0671691 | 9/1995 | European Pat. Off. | G06F 13/12 |
| 0742612 | 11/1996 | European Pat. Off. | H01R 43/26 |
| 1014624 | of 0000 | Japan . | |
| 1259442 | of 0000 | Japan . | |
| 5224792 | of 0000 | Japan . | |
| 9408035 | 4/1994 | WIPO | G06F 13/40 |

OTHER PUBLICATIONS

VLSI and Computer Peripherals, Hamburg; May 8–12, 1989; W. Proebster et al.; VLSI Based Tools for Monitoring Bus Communication Channels; pp. 4–81–84.

"Automatic Small Computer–System Interface Termination Circuit for Narrow/Wide Devices on Wide Bus" IBM Technical Disclosure Bulletin. vol. 40, No. 4, Apr. 1997, New York, US, pp. 79–82, XP000728275.

*Primary Examiner*—Ayaz R. Sheikh
*Assistant Examiner*—David A. Wiley

[57] ABSTRACT

An auto-termination method and apparatus for use with either active high or active low terminators are disclosed. The method includes the steps of (a) forcing a terminator to a first state by impressing a first voltage upon an input of the terminator; (b) determining, from the first voltage, a second voltage that when applied to the input of the terminator places the terminator in a second state; and (c) selectively forcing the terminator to the second state by impressing the second voltage upon the input of the terminator. The apparatus includes a terminator and a controller. The terminator is coupled to the bus and includes an input that is coupled to a first voltage that forces the terminator to a first state. The controller is coupled to the input of the terminator and is configured to determine the voltage of the first voltage coupled to the input of the terminator and to selectively force the terminator to a second state by impressing a second voltage upon the input of the terminator that is different than the first voltage.

18 Claims, 2 Drawing Sheets

U.S. PATENT DOCUMENTS

| | | | |
|---|---|---|---|
| 5,450,425 | 9/1995 | Gunn et al. | 371/67.1 |
| 5,455,926 | 10/1995 | Keele et al. | 395/404 |
| 5,465,042 | 11/1995 | Samela et al. | 324/71.1 |
| 5,467,453 | 11/1995 | Kocis | 395/281 |
| 5,469,554 | 11/1995 | Tucker et al. | 395/325 |
| 5,473,264 | 12/1995 | Mader et al. | 326/30 |
| 5,495,584 | 2/1996 | Holman, Jr. et al. | 395/308 |
| 5,510,701 | 4/1996 | Samela et al. | 324/71.1 |
| 5,511,229 | 4/1996 | Tsujimoto | 395/851 |
| 5,546,017 | 8/1996 | Vitunic | 326/30 |
| 5,553,250 | 9/1996 | Miyagawa et al. | 395/309 |
| 5,555,510 | 9/1996 | Verseput et al. | 364/514 |
| 5,564,024 | 10/1996 | Pemberton | 395/283 |
| 5,568,046 | 10/1996 | Samela et al. | 324/71.1 |
| 5,574,946 | 11/1996 | Sala | 395/825 |
| 5,583,448 | 12/1996 | Corder et al. | 326/30 |
| 5,585,741 | 12/1996 | Jordan | 326/30 |
| 5,586,271 | 12/1996 | Parrett | 395/283 |
| 5,613,074 | 3/1997 | Galloway | 395/280 |
| 5,635,583 | 6/1997 | Kikinis | 326/30 |
| 5,664,221 | 9/1997 | Amberg et al. | 395/829 |
| 5,680,537 | 10/1997 | Byers et al. | 395/182.03 |
| 5,680,555 | 10/1997 | Bodo et al. | 395/306 |
| 5,715,409 | 2/1998 | Bucher et al. | 395/309 |
| 5,751,977 | 5/1998 | Alexander | 395/306 |
| 5,764,925 | 6/1998 | Noonan | 395/281 |
| 5,768,621 | 6/1998 | Young | 395/844 |
| 5,781,028 | 7/1998 | Decuir et al. | 326/30 |

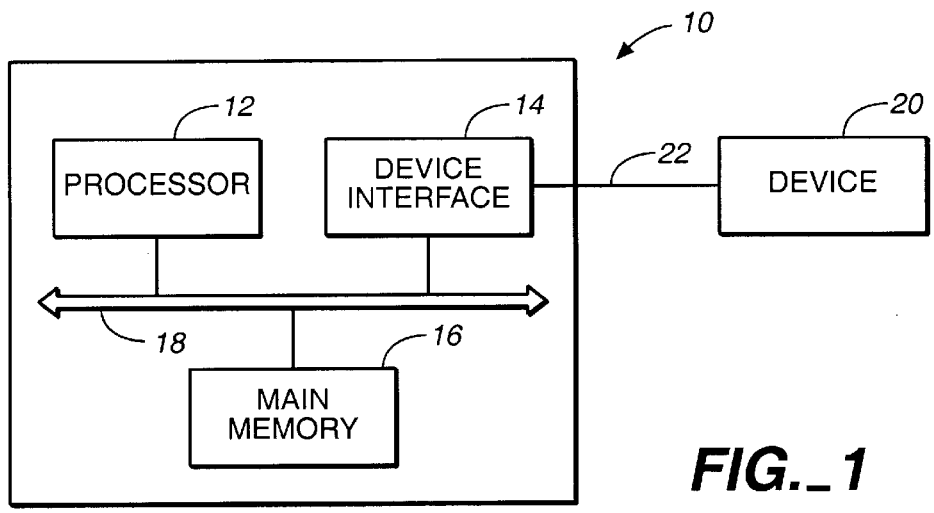
FIG._1
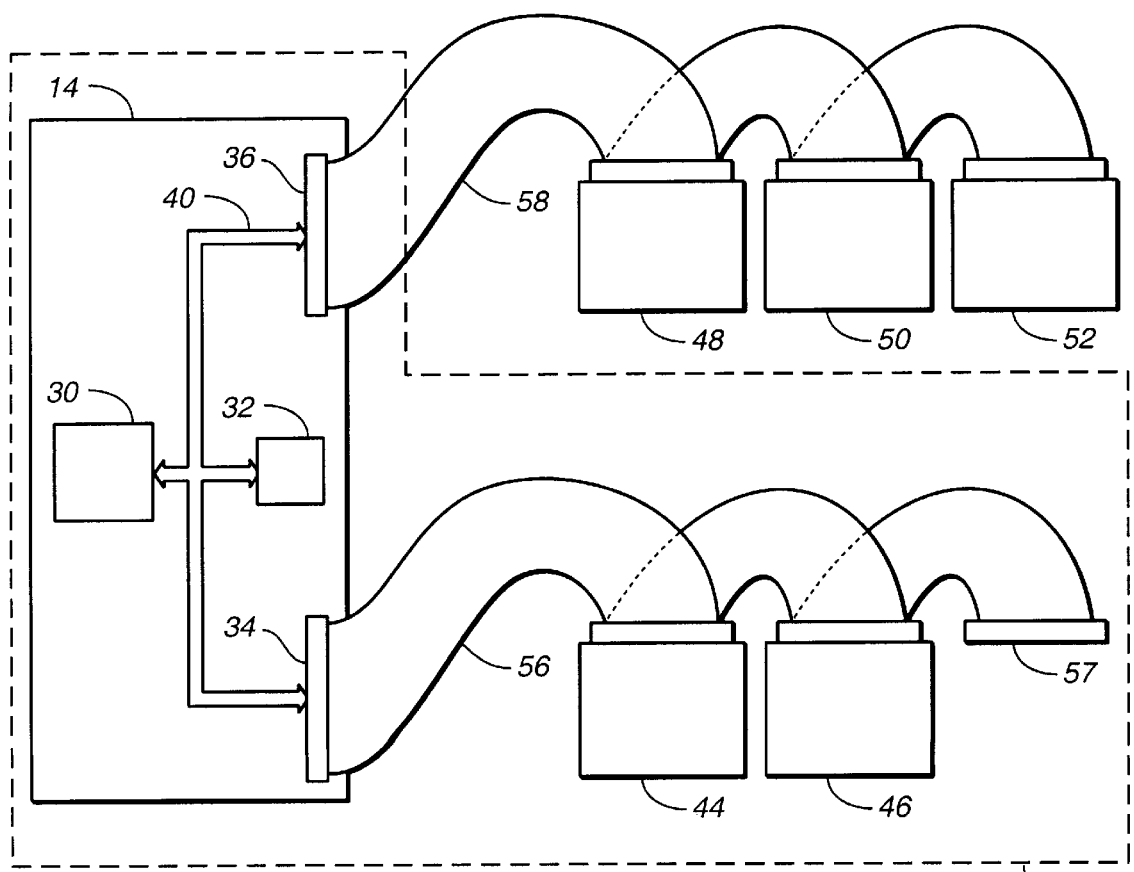
FIG._3

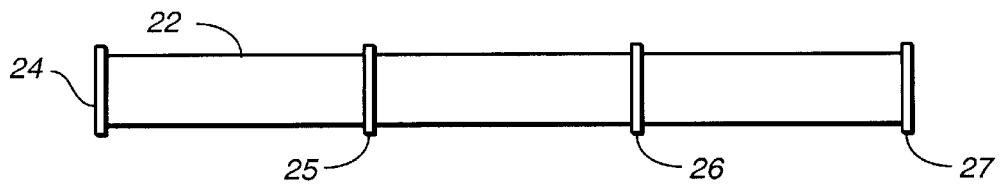
FIG._2
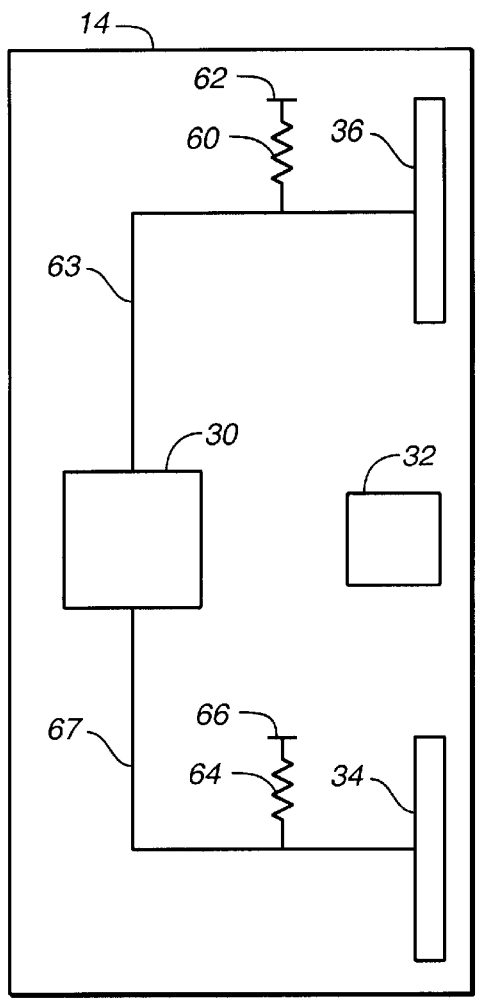
FIG._4
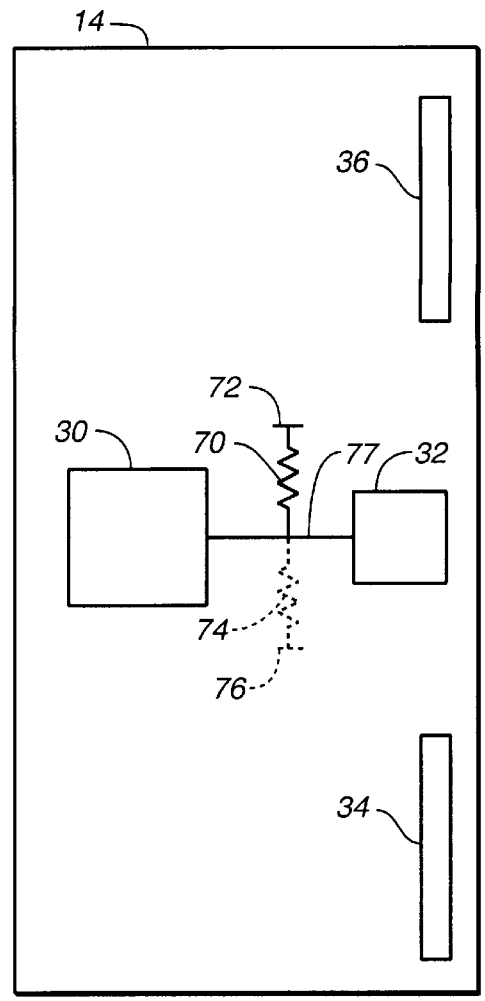
FIG._5

AUTO-TERMINATION METHOD AND APPARATUS FOR USE WITH EITHER ACTIVE HIGH OR ACTIVE LOW TERMINATORS

BACKGROUND OF THE INVENTION

The present invention relates generally to automatic termination of buses to enhance data transmission quality, and more particularly to an auto-termination method and apparatus for use with either active high or active low terminators.

Today's standard computer architectures call for a number of separate components, such as a central processing unit ("CPU"), memory, ports and peripheral devices to be coupled together by electrical buses to provide a pathway for data between the various components. Electrical buses are simply groups of conductors (or lines) designed to operate as a group.

Components transmit data over buses by changing voltages on the various lines of the bus. In binary digital computers, each line in a bus is capable of assuming one of two possible states at a given moment. These states are represented by presence or absence of a voltage, or potential difference relative to ground, on each of the lines.

In the real world, buses are real electrical conductors and therefore contain impedance just as do all real conductors. This impedance traps electrical charge within the line, presenting, in a sense, a momentum against which the change must take place. When the line is directed to change from a binary one to a binary zero (meaning a grounding of the line), it resists the change, typically causing a voltage oscillation at the point of transition (termed "ringing"). This ringing may be of sufficient magnitude as to cause components reading data from the bus to misread the oscillation as the presence of a voltage (a binary one) instead of the intended binary zero, thereby corrupting the flow of data. Therefore, in such conductors, it is standard practice to provide a means by which to dissipate the electrical charge quickly and damp the ringing, so as to restore data transmission fidelity. Damping is achieved through use of a terminator, which can include a plurality of resistive elements or active switches.

Some buses require terminators at each end of the bus to provide effective damping. One such bus standard is the small computer systems interface ("SCSI") bus. The SCSI bus is designed to operate in conjunction with microcomputers (also termed personal computers or "PCs") to provide an interface to SCSI standard peripheral devices. SCSI buses require a device interface card or controller card to manage communication of data between the PC and the SCSI devices and between the SCSI devices themselves. In PCs, this device interface card is typically placed in a slot within the main chassis of the PC. The device interface card contains a controller that manages the SCSI bus and at least one SCSI port allowing SCSI devices to couple to the card. SCSI devices are daisy chained together with a common cable. All SCSI devices operate on common signals, and both ends of the cable are terminated with hardware terminators. The terminators, that can be connected to either SCSI devices or to the SCSI cable itself are, as stated above, required to make data transfers on the SCSI bus reliable.

Devices connected to SCSI chains must have the correct number of terminators for proper operation and to prevent damage to the SCSI interface card. In systems that utilize SCSI devices, there can be no more than two terminators in a chain of SCSI devices, one at each end of the physical chain. This means that, if more than two SCSI devices are connected in a SCSI daisy chain, the middle device(s) on the cable must not have terminators coupled to the SCSI bus.

Some device interface cards provide auto-termination circuitry that determines whether the device interface card is at an end of the SCSI bus and that activates terminators when so determined. Two types of terminators, however, exist in the industry. The first type of terminator is enabled, thereby terminating bus lines that are coupled to the terminator, when a pin of the terminator is forced to a low voltage state. The present document refers to this first type of terminator as an "active low terminator" due to the terminator being enabled (activated) with a low voltage signal. The second type of terminator is enabled, thereby terminating bus lines that are coupled to the terminator, when a pin of the terminator is forced to a high voltage state. The present document refers to this second type of terminator as an "active high terminator" due to the terminator being enabled (activated) with a high voltage signal.

Since two types of terminators are prevalent in the industry, some manufacturers of device interface cards use one type of terminator, some use the other type of terminator, and some use both types of terminators. The problem is that the type of terminator used effects the logic for generating the enable/disable voltages and in known device interface cards this logic was either implemented in the controller of the device interface card or was implemented using other hardware on the device interface card. As a result, manufactures of the controllers utilized in the device interface cards had to implement two types of controllers (one for active low terminators and one for active high terminators) in order to compete for the whole device interface card market. It should be apparent that designing, manufacturing, testing, etc. is more expensive for two controllers rather than for only one controller that can be utilized with both types of terminators.

What is needed therefore, is a method and apparatus that enables a single controller to be used in device interface card designs that utilize either active high or active low terminators.

SUMMARY OF THE INVENTION

In accordance with one embodiment of the present invention, there is provided a method of terminating a bus. The method includes the steps of (a) forcing a terminator to a first state by impressing a first voltage upon an input of the terminator; (b) determining, from the first voltage, a second voltage that when applied to the input of the terminator places the terminator in a second state; and (c) selectively forcing the terminator to the second state by impressing the second voltage upon the input of the terminator.

Pursuant to another embodiment of the present invention, there is provided a device interface for controlling a bus. The device interface includes a terminator and a controller. The terminator is coupled to the bus and includes an input that is coupled to a first voltage that forces the terminator to a first state. The controller is coupled to the input of the terminator and is configured to determine the level of the first voltage coupled to the input of the terminator and to selectively force the terminator to a second state by impressing a second voltage upon the input of the terminator that is different than the first voltage.

Pursuant to yet another embodiment of the present invention, there is provided a data processing system. The data processing system includes a bus, a terminator, a controller, a processor, and a memory. The terminator is coupled to the bus and includes an input that is coupled to a first voltage that forces the terminator to a first state. The controller is coupled the input of the terminator. The processor is coupled to the bus via the controller and the memory is coupled to the processor. The memory has stored therein a plurality of instructions that when executed by the processor configure the controller to determine the level of the first voltage coupled to the terminator and to selectively force the terminator to a second state by impressing a second voltage upon the input of the terminator that is different than the first voltage.

It is an object of the present invention to provide an Improved bus controller.

It is a further object of the present invention to provide a controller chip that may be used with either active high or active low terminators.

It is yet another object of the present invention to provide a method and apparatus for automatically determining the type of terminator used by the controller.

It is still another object of the present invention to provide a method and apparatus for automatically terminating a bus at a controller.

The above and other objects, features, and advantages of the present invention will become apparent from the following description and the attached drawings.

BRIEF DESCRIPTION OF THE DRAWINGS

FIG. 1 shows a computer system suitable for incorporating the features of the present invention therein;

FIG. 2 shows a cable suitable for coupling devices in a daisy chain fashion;

FIG. 3 shows a device interface with several peripheral devices coupled thereto and which incorporates features of the present invention therein;

FIG. 4 shows hardware for generating control signals for determining whether devices are attached to the device interface of FIG. 3; and FIG. 5 shows hardware for generating a control signal for determining whether a terminator is active high or active low.

DETAILED DESCRIPTION OF THE PREFERRED EMBODIMENT

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a diagram of a computer system 10 having a processor 12, a device interface 14, a main memory 16, a system bus 18, and a device 20 coupled to the device interface 14 by a cable or ribbon 22. The system bus 18 includes several conductors or lines which operatively couple the processor 12, the device interface 14, and the main memory 16 together. The processor 12 fetches, decodes, and executes instructions stored in the main memory 16. The processor 12 also manages the transfer of data to and from the device interface 14. Furthermore, by executing a device driver stored in the main memory 16, the processor 12 accesses data of the device 20 via the device interface 14 and controls the termination of the peripheral bus at the device interface 14.

The peripheral bus consists of several conductors or lines that operatively couple devices such as device 20 to the device interface 14. As will be discussed in more detail with reference to FIG. 3, the peripheral bus may include more than one cable and may operatively couple more than one device to the device interface 14. However, as depicted in FIG. 1, the peripheral bus consists of the single cable 22 and its several conductors.

The device interface 14 is sometimes referred to as a host controller card or a host adapter. The name comes from the fact that the device interface 14 is typically a controller card plugged into an expansion slot of a host computer 10 and provides the electrical and programming interface between the host processor 12 and devices coupled to the device interface 14. While this device interface 14 is typically a separate hardware card coupled to the system bus 18 via an expansion slot of the computer 10, the device interface 14 could alternatively be integrated circuitry on the main system board of the computer 10.

Now referring to FIG. 2, there is shown a cable or ribbon 22 suitable for coupling devices to a device interface 14 in a daisy chain fashion. The cable 22 typically has a connector 24 that allows the cable 22 to be detachably coupled to a receiving connector or port of the device interface 14. The cable 22 also has various connectors 25, 26, 27 for detachably coupling multiple devices in a daisy chain fashion. The cable 22 as depicted would allow up to three devices to be coupled to the cable 22; however, cables having more or less connectors would also be suitable. Furthermore, due to the manner in which cables such as cable 22 are typically manufactured, devices must be coupled to the cable 22 starting from the connector closest to the connector 24 and then connected in succession moving away from connector 24. In other words, if only one device were coupled to cable 22, the one device would need to be coupled to connector 25, and if two devices were coupled to cable 22, the two devices would need to be coupled to connectors 25 and 26.

Referring now to FIG. 3, there is depicted a device interface or host controller 14 with several peripheral devices 44, 46, 48, 50, 52 coupled thereto. In the preferred embodiment, the device interface 14 includes a SCSI bus controller 30, a terminator or terminating circuit 32, an internal SCSI connector or port 34, an external SCSI connector or port 36, and an interface bus 40 which operatively couples the controller 30 and the terminator 32 to the ports 34, 36.

The peripheral devices 44, 46, 48, 50, 52 in the preferred embodiment are SCSI disk drives; however other types of SCSI-compliant devices could also be similarly coupled to the device interface 14, such as tape drives, compact disc (CD) drives, RAID devices, and the like. Furthermore, each of these peripheral devices 44, 46, 48, 50, 52 in the preferred embodiment has a mechanism for terminating the peripheral bus at the device. These mechanisms for terminating the peripheral bus may consist of a socket, where an RPAK (a resistor pack) can be manually inserted; a jumper or switch that can be used to manually enable/disable a terminator; or a sensing circuit for automatically enabling/disabling a terminator.

As described in the background, it is desirable to terminate the ends of the peripheral bus. For example, the peripheral bus depicted in FIG. 3 includes the cable 56, the interface bus 40, and the cable 58. Therefore, to properly terminate the peripheral bus as depicted in FIG. 3, the device 52 which is at one end of the peripheral bus would terminate one end of the peripheral bus and the device 46 which is at the other end of the peripheral bus would terminate the other end of the peripheral bus. The device interface 14 in this configuration resides in a middle portion of the peripheral bus. Therefore, the peripheral bus is not terminated at the device interface 14 (i.e. the terminator 32 is disabled).

If, however, the external chain of devices 48, 50, 52 were not coupled to the port 36, then the peripheral bus would include the interface bus 40 and the cable 56. Therefore, to properly terminate this peripheral bus, the device 46 which is at one end of the peripheral bus would terminate one end of the peripheral bus and the device interface 14 which is at the other end of the peripheral bus would terminate the other end of the peripheral bus by enabling the terminator 32.

In the above examples, the connector 57 of cable 56 is not coupled to a device. As a result, the end of the peripheral bus was at device 46 and not the end of the cable 56. In other words, the devices that are coupled to the peripheral bus, including the device interface 14, determine the ends of the peripheral bus which are not necessarily the ends of the cables attached to the ports 34, 36 of the device interface 14.

Returning to the various components of the device interface 14, the SCSI bus controller 30, in the preferred embodiment, is a SCSI interface controller chip 53C825 available for Symbios Logic, Inc., Ft. Collins, Colo. (previously known as NCR Corporation, Microelectronics Products Division), and provides an interface between the SCSI peripheral bus and the computer system 10. This SCSI bus controller 30 transmits and receives data and SCSI control signals across the peripheral bus (the SCSI protocol and interface signals are well known in the art, and need not be further described).

In a preferred embodiment of the invention, the terminator or terminating circuit 32 is either a UC5613 terminator manufactured by the Unitrode Corporation or a DS2105 terminator manufactured by Dallas Semiconductor. The UC5613 terminator provides a DISCNCT (disconnect) pin that when forced to a low voltage state causes the UC5613 terminator to terminate the bus lines that are coupled to the UC5613 terminator. Therefore, since the UC5613 terminator terminates bus lines in response to a low voltage signal, the UC5613 terminator is an active low terminator as defined herein. In contrast, the DS2105 terminator provides a $\overline{PD}$ (power down) pin that when forced to a high voltage state causes the DS2105 terminator to terminate the bus lines that are coupled to the DS2105 terminator. Therefore, since the DS2105 terminator terminates bus lines in response to a high voltage signal, the DS2105 terminator is an active high terminator as defined herein.

The configuration of ports 34, 36 allows for internal SCSI devices and external SCSI devices to be used with the device interface 14. The distinction between internal and external pertains to whether the devices are internal or external to the particular computer housing 54 that the device interface 14 resides in. For example, one computer configuration may have an internal 540 Mbyte hard disk drive mounted inside the housing 54 of the computer 10, while also having an external CD-ROM disk drive laying on a desk beside the computer 10. In this configuration, an internal cable 56 would couple the internal hard disk drive to the internal port 34, and an external cable 58 would couple the CD-ROM drive to the external port 36 of the device interface 14 (alternatively, the external cable 58 from the CD-ROM drive could attach to a housing connector mounted on the housing 54 of the computer 10, with another cable running inside the housing 54 from the housing connector to the external port 36).

FIG. 4 illustrates hardware suitable for generating control signals that the controller 30 can use for determining whether devices are attached to the ports 34, 36. The hardware includes a present1* line 63 that couples a ground pin of port 36 to a present1* input of controller 30 and a pull-up resistor 60 couples the present1* line 63 to a reference voltage 62 ("*" denotes active when low). Likewise, a present2* line 67 couples a ground pin of port 34 to a present2* input of controller 30 and a pull-up resistor 64 couples the present2* line 67 to a reference voltage 66. In the preferred embodiment the resistors 60, 64 are 4.7 kilo-ohms (KΩ) each, although other values such as 1 KΩ or 10 KΩ are also possible. The reference voltages 62, 66 are each preferably +5 volts (V), although other values such as +3 volts or +12V are also possible. The ground pin of port 36 may be one of several ground pins of the port 36. Likewise, the ground pin of port 34 may be one of several ground pins of the port 34. However, to minimize the chance of corrupting data on the peripheral bus, the present invention preferably uses ground pins paired with the TERM POWER lines of the SCSI bus.

In operation, the resistor 60 and the reference voltage 62 impress a voltage on the present1* line 63 when no devices are coupled to the port 36. Therefore, when no devices are coupled to the port 36, the present1* line 63 has a voltage impressed on it and is considered to be in a high, not active state. On the other hand, if a device is coupled to the port 36, then the device grounds the ground pins of port 36 thereby causing the present1* line 63 to enter a low, active state. Thus, the present1* line 63 is high if no device is present and low if at least one device is present (more than one device could be coupled to the port via a daisy-chain configuration).

Furthermore, the resistor 64 and the reference voltage 66 impress a voltage on the present2* line 67 when no devices are coupled to the port 34. Therefore, when no devices are coupled to the port 34, the present2* line 67 has a voltage impressed on it and is considered to be in a high, not active state. On the other hand, if a device is coupled to the port 34, then the device grounds the ground pins of port 34 thereby causing the present2* line 67 to enter a low, active state. Thus, the present2* line 67 is high if no device is present and low if at least one device is present (more than one device could be coupled to the port via a daisy-chain configuration).

Shown in FIG. 5 is hardware suitable for generating a control signal that the controller 30 can use for determining whether terminator 32 is active high or active low. The hardware includes a control line 77 that couples a bi-directional pin of the controller 30 to the enable/disable input of the terminator 32 and includes a resistor coupled between the control line 77 and a reference voltage. The resistor and the reference voltage are used to place the terminator 32 in a default state that is known to the auto-termination package. The auto-termination package in the preferred embodiment includes the controller 30 and device driver software that when executed controls and configures various aspects of the device interface 14.

For example, the auto-termination package may be pre-configured such that the auto-termination package expects the terminator 32 to be placed in an enabled default state. Therefore, if the terminator 32 is an active high terminator, then a resistor 70 couples the control line 77 to a reference voltage 72 such as +5 volts; however, if the terminator 32 is an active low terminator, then a resistor 74, instead of resistor 70, couples the control line 77 to a reference voltage 76 such as ground.

Likewise, the auto-termination package may instead be pre-configured such that the auto-termination package expects the terminator 32 to be placed in a disabled default state. Therefore, if the terminator 32 is an active low terminator, then a resistor 70 couples the control line 77 to a reference voltage 72 such as +5 volts; however, if the terminator 32 is an active high terminator, then a resistor 74, instead of resistor 70, couples the control line 77 to a reference voltage 76 such as ground.

The point here is that the auto-termination package may be pre-configured to expect that the default state of the terminator 32 to be either enabled or disabled. If the terminator 32 is placed in the incorrect default state, the auto-termination package will either need to be reconfigured or the terminator 32 will need to be reconfigured to the correct default state in order for proper termination to be maintained. This reconfiguration would most likely require some kind of user intervention, thus defeating the "auto" termination feature. However, once reconfigured the auto-termination package would regain the auto-termination feature.

In the preferred embodiment the resistors 70, 74 are 4.7 kilo-ohms (KΩ) although other values such as 1 KΩ or 10 KΩ are also possible. The reference voltages 72 is preferably +5 volts (V), although other values such as +3 volts or +12V are also possible whereas the reference voltage 76 is preferably ground, although other values are also possible.

In operation, the resistor 70 and the reference voltage 72 impress a high voltage on the control line 77 thereby placing the terminator in its default state whereas the resistor 74 and the reference voltage 76 impress a low voltage on the control line 77 thereby placing the terminator 32 in its default state. Since only one of the resistors 70, 74 are coupled to their respective reference voltages 72, 76 at a given time, the controller 30 may sample the control line 77 so that the auto-termination package may determine whether a high voltage or a low voltage places the terminator 32 in its default state. Furthermore, once the auto-termination package determines the proper voltage level for placing the terminator 32 in its default state, the auto-termination package may force a different voltage level on the control line 77 when the terminator 32 should be placed in its non-default state in order to maintain proper termination of the peripheral bus.

For example, in the preferred embodiment, the auto-termination package expects the terminator 32 to be placed in an enabled default state. Therefore, if the terminator 32 is an active high terminator, then a resistor 72 is coupled between the control line 77 and reference voltage 72 to impress a high voltage upon the control line 77. This high voltage upon control line 77 enables the terminator 32 thereby terminating the peripheral bus at the device interface 14. The auto-termination package may then sample the control line 77 to determine that the terminator 32 is enabled with a high voltage. After sampling the control line 77, the auto-termination package knows to force a low voltage upon the control line 77 when the peripheral bus should not be term ed at the device interface 14.

In the preferred embodiment, any reset condition (e.g. a SCSI RESET signal on the peripheral bus, host computer power up, removal of a device coupled to the peripheral bus, etc.) triggers execution of auto-termination instructions of the device driver. These instructions when executed configure the bi-directional pin, to which the control line 77 is connected, for input and cause the state of the present1* line 63, the present2* line 67, and the control line 77 to be determined. After the state of the present1* line 63, the present2* line 67, and the control line 77 have been determined, the instructions when executed configure the bi-directional pin, to which the control line 77 is coupled, for output. Finally, from the states of the present1* line 63, the present2* line 67, and the control line 77, these instructions when executed then cause the controller 30 to force the control line 77 to a voltage that will place the terminator 32 in the proper state for maintaining proper termination of the peripheral bus.

As stated above the auto-termination package in the preferred embodiment is pre-configured to expect the terminator 32 to be in an enabled default state. Therefore, if the terminator 32 is an active high terminator the device driver when executed causes the control line 77, in response to the present1* line 63 and the present2* line 67, to have the voltages represented in Table 1. Furthermore, if the terminator 32 is an active low terminator the device driver when executed causes the control line 77, in response to the present1* line 63 and the present2* line 67, to have the voltages represented in Table 2. In Table 1 and in Table 2, a "0" represents a low voltage level and a "1" represents a high voltage level.

TABLE 1

| present1* 63 | present2* 67 | control 77 |
|---|---|---|
| 0 | 0 | 0 |
| 0 | 1 | 1 |
| 1 | 0 | 1 |
| 1 | 1 | 1 |

TABLE 2

| present1* 63 | present2* 67 | control 77 |
|---|---|---|
| 0 | 0 | 1 |
| 0 | 1 | 0 |
| 1 | 0 | 0 |
| 1 | 1 | 0 |

Since the terminator 32 is placed in a default state, the controller 30 need only impress the non-default voltages upon the control line 77. In other words, if the control line 77 is coupled to a bi-directional pin of the controller 30, the bi-directional pin can remain an input when the terminator 32 should remain in its default state thereby allowing the hardware of FIG. 5 to force the terminator 32 into its default state. However, when the terminator should be placed into its non-default state, the bi-directional pin can be configured for output and the controller 30 can impress a voltage upon control line 77 that forces the terminator 32 into its non-default state.

The device driver assumes that the various peripheral devices coupled to the device interface 14 will properly terminate their respective ends of the bus. In other words, the above tables only depict whether or note peripheral bus should be terminated at the device interface 14. The peripheral devices such as 46, 52 (FIG. 3) at the ends of bus are responsible for proper terminating the peripheral bus at their respective ends of the peripheral bus.

By placing the logic for generating the voltages to impress upon the control line 77 in the device driver, the present invention may be practiced with several existing SCSI bus controllers assuming the controllers having pins available for receiving the present1* line 63 and the present 2* line 67 and a bi-directional pin for receiving the control line 77 and impressing the appropriate voltage level upon the control line 77. However, the present invention is not so limited and may be practiced by incorporating the logic for generating the voltages into the controller 30 or other hardware.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A method of terminating a bus, comprising the steps of:

forcing a terminator to a first state by impressing a first voltage upon an input of the terminator;

determining, from the first voltage, a second voltage that when applied to the input of the terminator places the terminator in a second state; and selectively forcing the terminator to the second state by impressing the second voltage upon the input of the terminator.

2. The method of claim 1, wherein:

the step of forcing the terminator to the first state includes the step of enabling the terminator; and the step of selectively forcing the terminator to the second state includes the step of selectively disabling the terminator.

3. The method of claim 1, wherein:

the step of forcing the terminator to the first state includes the step of disabling the terminator; and the step of selectively forcing the terminator to the second state includes the step of selectively enabling the terminator.

4. The method of claim 1, wherein the step of forcing the terminator to the first state includes the step of:

coupling the input of the terminator to a reference voltage.

5. The method of claim 1, wherein the step of selectively forcing the terminator to the second state includes the steps of:

determining whether a first device is coupled to a first port; and determining whether a second device is coupled to a second port.

6. The method of claim 1, wherein the step of selectively forcing the terminator to the second state includes the step of:

executing a plurality of instructions to determine whether to force the terminator to the second state.

7. The method of claim 6, wherein the step of selectively forcing the terminator to the second state further includes the step of:

configuring a pin of a controller to impress the second voltage upon the input of the terminator.

8. A device interface for controlling a bus, comprising:

a terminator coupled to the bus and comprising an input that is coupled to a first voltage that forces said terminator to a first state; and a controller coupled to said input of said terminator and configured to determine the level of said first voltage coupled to said input of said terminator and to selectively force said terminator to a second state by impressing a second voltage upon said input of said terminator that is different than said first voltage.

9. The device interface of claim 8, wherein said first state disables said terminator; and wherein said second state enables said terminator.

10. The device interface of claim 8, wherein said first state enables said terminator; and wherein said second state disables said terminator.

11. The device interface of claim 8, further comprising:

a device driver comprising a plurality of instructions that when executed by a processor configures said controller to selectively force said terminator to said second state.

12. The device interface of claim 8, further comprising:

a first port configured to receive and to couple a first device to the bus; and a second port configured to receive and to couple a second device to the bus; and wherein said controller is further coupled to said first port and to said second port and is further configured to detect whether said first device is coupled to said first port and to detect whether said second device is coupled to said second port.

13. The device interface of claim 12, further comprising:

a device driver comprising a plurality of instructions that when executed configures said controller to force said terminator to said second state when said first device is coupled to said first port and said second device is coupled to said second port.

14. A data processing system, comprising:

a bus;

a terminator coupled to said bus, said terminator comprising an input that is coupled to a first voltage that forces said terminator to a first state;

a controller coupled to said first port, to said second port, and to said input of said terminator;

a processor coupled to said bus via said bus controller; and a memory coupled to the processor and having stored therein a plurality of instructions that when executed by said processor configure said controller to determine the level of said first voltage coupled to said terminator and to selectively force said terminator to a second state by impressing a second voltage upon said input of said terminator that is different than said first voltage.

15. The data processing system of claim 14, wherein:

said first state disables said terminator; and said second state enables said terminator.

16. The data processing system of claim 14, wherein:

said first state enables said terminator; and said second state disables said terminator.

17. The data processing system of claim 14, further comprising:

a first port configured to receive and couple a first device to said bus; and a second port configured to receive and couple a second device to said bus; and wherein said controller is further configured to detect whether a first device is coupled to said first port and to detect whether a second device is coupled to said second port.

18. The data processing system of claim 17, wherein said memory further comprises a plurality of instructions that when executed by said processor further configures said controller to force said terminator to said second state when said first device is coupled to said first port and said second device is coupled to said second port.

* * * * *